United States Patent [19]

Lopez-Aguado et al.

[11] Patent Number: 6,098,154

[45] Date of Patent: *Aug. 1, 2000

[54] APPARATUS AND METHOD FOR GENERATING A STRIDE USED TO DERIVE A PREFETCH ADDRESS

[75] Inventors: Herbert Lopez-Aguado, Sunnyvale; Denise Chiacchia, Campbell; Gary Lauterbach, Los Altos Hills, all of Calif.

[73] Assignee: Sun Microsystems, Inc., Palo Alto, Calif.

[ * ] Notice: This patent is subject to a terminal disclaimer.

[21] Appl. No.: 08/881,050

[22] Filed: Jun. 25, 1997

[51] Int. Cl.$^7$ ...................................................... G06F 12/00
[52] U.S. Cl. ........................ 711/137; 711/213; 711/118; 711/120; 711/122; 711/125; 712/207
[58] Field of Search ..................................... 711/137, 213, 711/118, 120, 122, 125, 131, 149, 168, 220; 712/207

[56] References Cited

U.S. PATENT DOCUMENTS

| | | | |
|---|---|---|---|
| 5,247,649 | 9/1993 | Bandoh | 711/130 |
| 5,274,790 | 12/1993 | Suzuki | 711/133 |
| 5,357,618 | 10/1994 | Mirza et al. | 711/3 |
| 5,367,656 | 11/1994 | Ryan | 711/213 |
| 5,434,989 | 7/1995 | Yamaguchi | 711/3 |
| 5,465,344 | 11/1995 | Hirai et al. | 711/133 |
| 5,481,737 | 1/1996 | Ito et al. | 711/211 |
| 5,566,324 | 10/1996 | Kass | 711/160 |
| 5,594,884 | 1/1997 | Matoba et al. | 711/125 |
| 5,802,562 | 9/1998 | Kahle | 711/122 |
| 5,829,010 | 10/1998 | Cherabuddi | 711/100 |

*Primary Examiner*—Hiep T. Nguyen
*Attorney, Agent, or Firm*—William S. Galliani; Pennie & Edmonds LLP

[57] ABSTRACT

A central processing unit (CPU) of a computer has a data caching unit which includes a novel dual-ported prefetch cache configured in parallel with a conventional single-ported data cache. In response to a data cache miss, the requested data is fetched from external memory and loaded into the data cache and into the prefetch cache. Thereafter, if a prefetch cache hit occurs, the physical address of the corresponding data request is provided to a prefetch engine which, in turn, adds a stride to the physical address to derive a prefetch address. This prefetch address identifies data which is predicted to be soon requested in subsequent instructions of the computer program. Data corresponding to the prefetch address is then retrieved from external memory and loaded into the prefetch cache. This prefetching operation frequently results in the prefetch cache storing data that is requested by subsequently executed instructions in a computer program. When this condition occurs, data is immediately retrieved from the prefetch cache and provided to execution units within the CPU, thereby eliminating latencies associated with external memory.

14 Claims, 7 Drawing Sheets

APPARATUS AND METHOD FOR GENERATING A STRIDE USED TO DERIVE A PREFETCH ADDRESS

CROSS-REFERENCE TO RELATED APPLICATIONS

This application is related to U.S. patent application Ser. No. 08/882,691, entitled "MICROPROCESSOR HAVING A PREFETCH CACHE" and bearing attorney docket No. A64703 WSG/WLP, to U.S. patent application Ser. No. 08/882,517, entitled "DATA LOAD HISTORY TRACKING CIRCUIT" and bearing attorney docket No. A64704 WSG/WLP, and to U.S. patent application Ser. No. 08/881,044, issued as U.S. Pat. No. 5,996,061, entitled "A METHOD FOR INVALIDATING DATA IDENTIFIED BY SOFTWARE COMPILER" and bearing attorney docket No. A64706 WSG/WLP, all filed on Jun. 25, 1997 and assigned to the assignee of the present invention.

BACKGROUND

1. Field of Invention

This invention relates to retrieving data from computer memory. Specifically, this invention relates to a technique of improving data bandwidth of the processing unit of a computer by prefetching data anticipated to be needed by subsequent instructions of a computer program.

2. Description of Related Art

Modern computer systems utilize a hierarchy of memory elements in order to realize an optimum balance between the speed, size, and cost of computer memory. Most of such computer systems employ one or more DRAM arrays as primary memory and typically include a larger, but much slower, secondary memory such as, for instance, a magnetic storage device or CD ROM. A small, fast SRAM cache memory is typically provided between the central processing unit (CPU) and primary memory. This fast cache memory increases the data bandwidth of the computer system by storing information most frequently needed by the CPU. In this manner, information most frequently requested during execution of a computer program may be rapidly provided to the CPU from the SRAM cache memory, thereby eliminating the need to access the slower primary and secondary memories. Although fast, the SRAM cache memory is very expensive and should thus be of minimal size in order to reduce cost. Accordingly, it is advantageous to maximize the frequency which with information requested by the CPU is stored in cache memory.

FIG. 1 is an illustration of a general purpose computer 10 including a CPU 12 having an on-board, or internal, cache memory 14. Typically, the internal cache 14 is divided into an instruction cache (I$), in which the most frequently requested instructions are stored, and a data cache (D$), in which the most frequently requested data is stored. The computer also includes an external cache (E$) 16 and a primary memory 18. During execution of a computer program, the computer program instructs the CPU 12 to fetch instructions by incrementing a program counter within the CPU 12. In response thereto, the CPU 12 fetches the instructions identified by the program counter. If the instruction requests data, an address request specifying the location of that data is issued. The CPU 12 first searches the internal cache 14 for the specified data. If the specified data is found in the internal cache 14, hereafter denoted as a cache hit, that data is immediately provided to the CPU 12 for processing. If, on the other hand, the specified data is not found in the internal cache 14, the external cache 16, is then searched. If the specified data is not found in the external cache 16, then the primary memory 18 is searched. The external cache 16 and primary memory 18 are controlled by an external cache controller 20 and a primary memory controller 22, respectively, which may be both housed within the CPU 12. If the specified data is not found in the primary memory 18, access is requested to system bus 24 which, when available, routes the address request to a secondary memory 26 via an I/O controller 28.

When the specified data is located in memory external to the CPU 12, i.e., in either the external cache 16, the primary memory 18, or the secondary memory 26, the data specified by the address request is routed to the CPU 12 for processing and, in addition, a corresponding row of data is loaded into the internal cache 14. In this manner, subsequent address requests identifying other information in that row will result in an internal cache hit and, therefore, will not require access to the much slower external memory. In this manner, latencies associated with accessing primary memory may be hidden, thereby increasing the data bandwidth of the CPU 12.

The processing of an address request through a memory hierarchy is illustrated in FIG. 2. First, the CPU program counter (PC) is incremented to specify a new address and, in response thereto, a corresponding instruction is fetched (step 40). Where, for instance, the instruction requests data, an address request specifying that data is provided to the data cache (D$) of the internal cache 14 for searching (step 42). If the specified data is in the data cache (a D$ hit), as tested at step 44, the specified data is immediately provided to the CPU (step 46). If the specified data is not in the data cache (a D$ miss), the external cache is searched for the specified data (step 48).

If the specified data is found in the external cache (an E$ hit), as tested at step 50, then the specified data is loaded into the data cache (step 52) and processing proceeds to step 44. If the specified data is not found in the external cache, then primary memory is searched (step 54). If the specified data is found in primary memory, as tested at step 56, it is loaded into the data cache (step 52) and provided to the CPU for processing; otherwise the specified data is retrieved from secondary memory (step 58) and loaded into the data cache and provided to the CPU.

As shown in FIG. 1, there are additional devices connected to the system bus 20. For example, FIG. 1 illustrates an input/output controller 30 operating as an interface between a graphics device 32 and the system bus 24. In addition, the figure illustrates an input/output controller 34 operating as an interface between a network connection circuit 36 and the system bus 24.

Since latencies of primary memory, e.g., the access speeds of DRAM, are not increasing as quickly as are the processing speeds of modern CPUs, it is becoming increasingly important to hide primary memory latencies. As discussed above, primary memory latencies are hidden every time there is an internal cache hit, for when there is such a hit, the requested information is immediately provided to the CPU for processing without accessing primary memory.

The data bandwidth of a computer system may also be increased by providing an additional parallel pipeline such that, for instance, two data requests may be performed per cycle. To accommodate the additional pipeline, the existing data cache may be dual ported or an additional data cache may be provided in parallel to the existing data cache. Each of these options, however, effectively doubles the cost of data cache memory. For instance, dual porting the existing data cache, while not significantly increasing the total size of the data cache, results in halving the effective data cache memory available for each of the pipelines. On the other hand, providing in parallel an additional data cache similar in size to the existing data cache, while preserving the effective cache memory available for each pipeline, undesirably results in a doubling of the effective size of the data cache. As a result, there is a need to accommodate an additional parallel pipeline without doubling the cost of data cache memory.

SUMMARY

A central processing unit (CPU) of a computer has a data caching unit which includes a novel dual-ported prefetch cache configured in parallel with a conventional single-ported data cache. The data cache is coupled to receive data requests from a first pipeline and the prefetch cache, which is much smaller than the data cache, is coupled to receive data requests from the first pipeline and from a second pipeline. If a data cache miss occurs, a row of data corresponding to the data request is fetched from external memory, e.g., an external cache, a primary memory, or a secondary memory, and then stored in the data cache and the prefetch cache.

Thereafter, if a prefetch cache hit occurs, the physical address of the corresponding data request is provided to a prefetch engine which, in turn, adds a stride to the physical address to derive a prefetch address. This prefetch address identifies data which is predicted to be soon requested in subsequent instructions of the computer program. Data corresponding to the prefetch address is then retrieved from external memory and loaded into the prefetch cache. This prefetching operation frequently results in the prefetch cache storing data that is requested by subsequently executed instructions in a computer program. When this condition occurs, data is immediately retrieved from the prefetch cache and provided to execution units within the CPU, thereby eliminating latencies associated with external memory.

BRIEF DESCRIPTION OF THE DRAWINGS

Like reference numerals refer to corresponding parts throughout the drawing figures.

DETAILED DESCRIPTION

Figure 1:
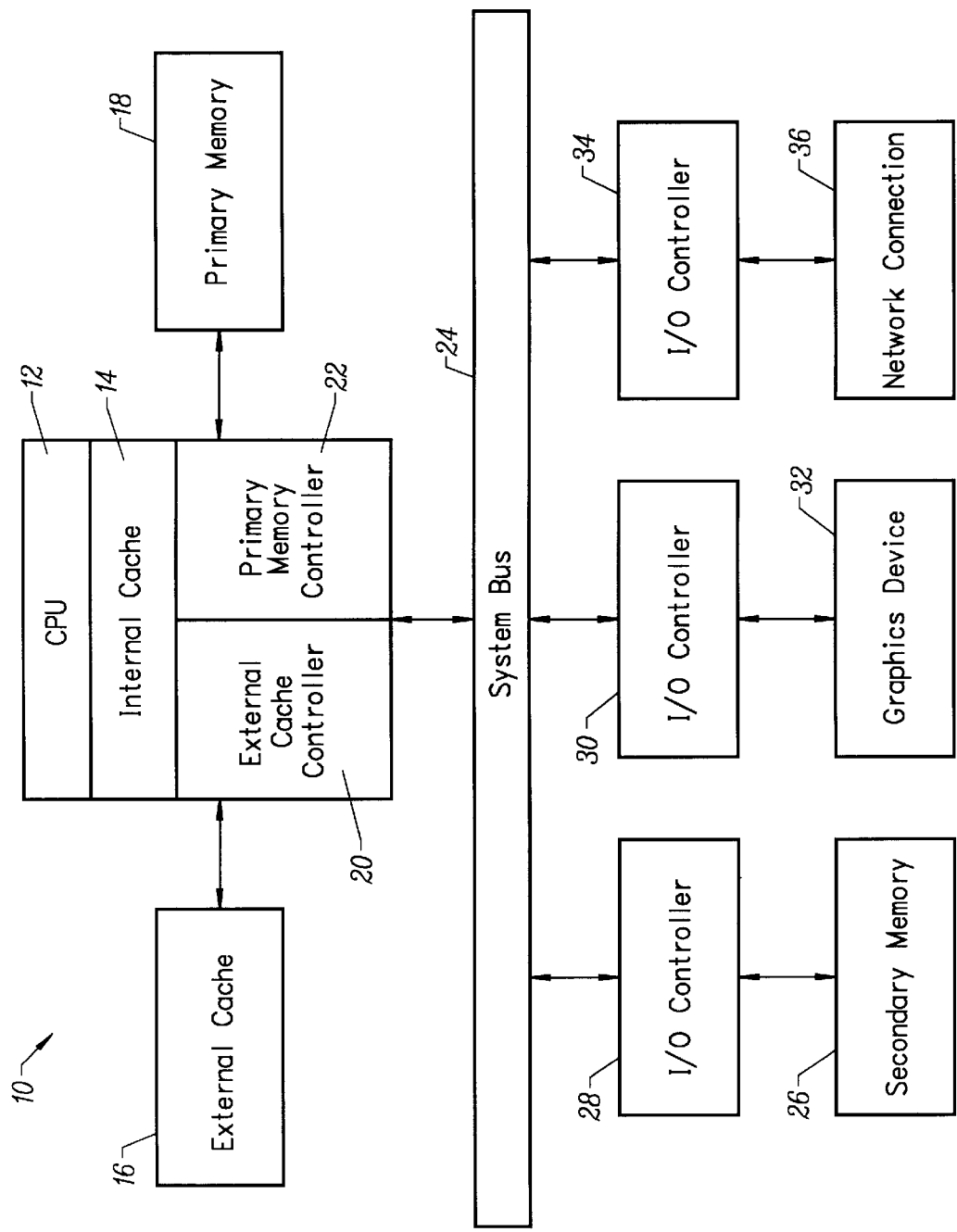
FIG. 1 illustrates a general purpose computer in accordance with the prior art.
Figure 2:
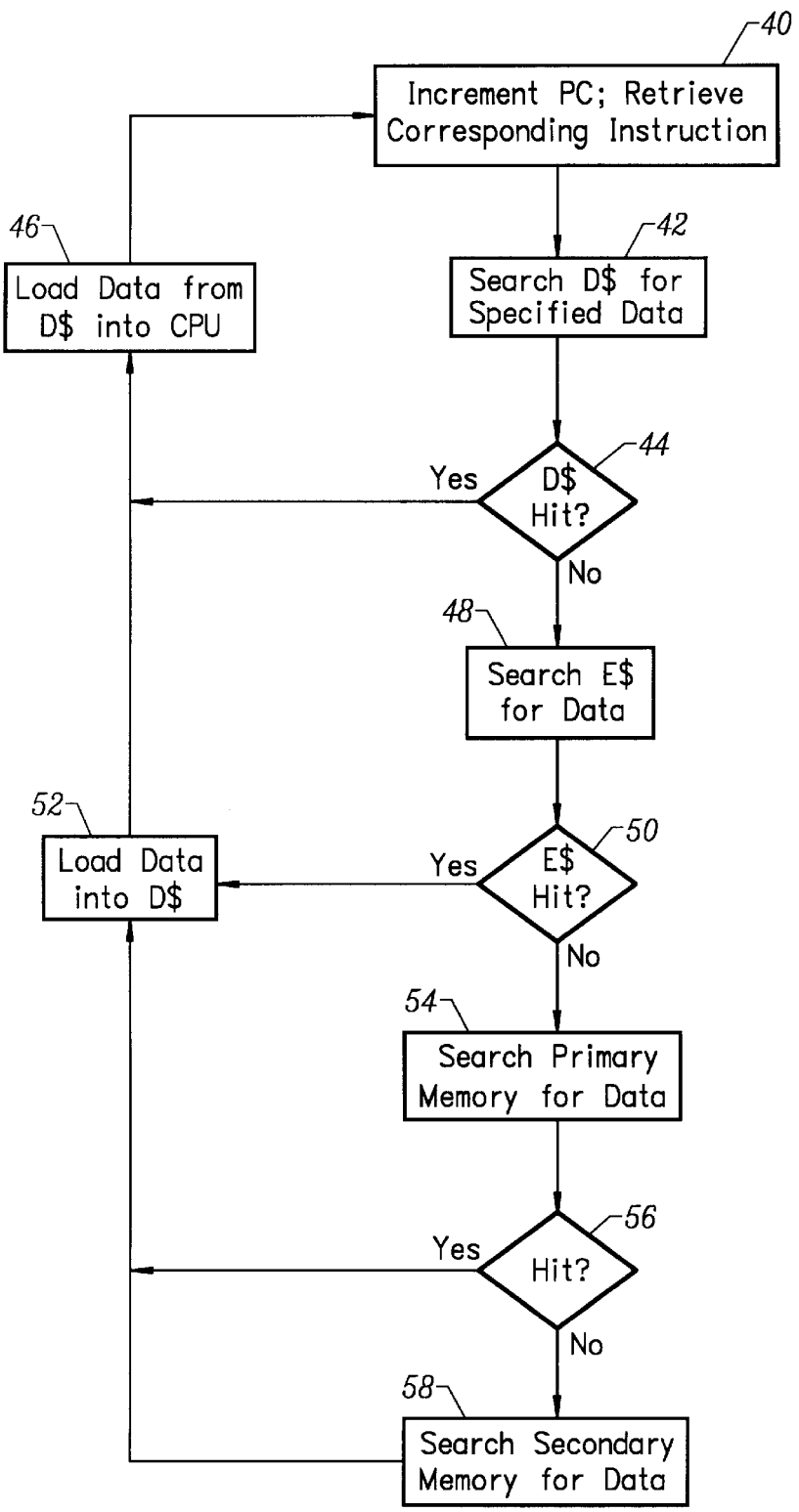
FIG. 2 illustrates the prior art processing of an address request through a computer memory hierarchy.
Figure 3:
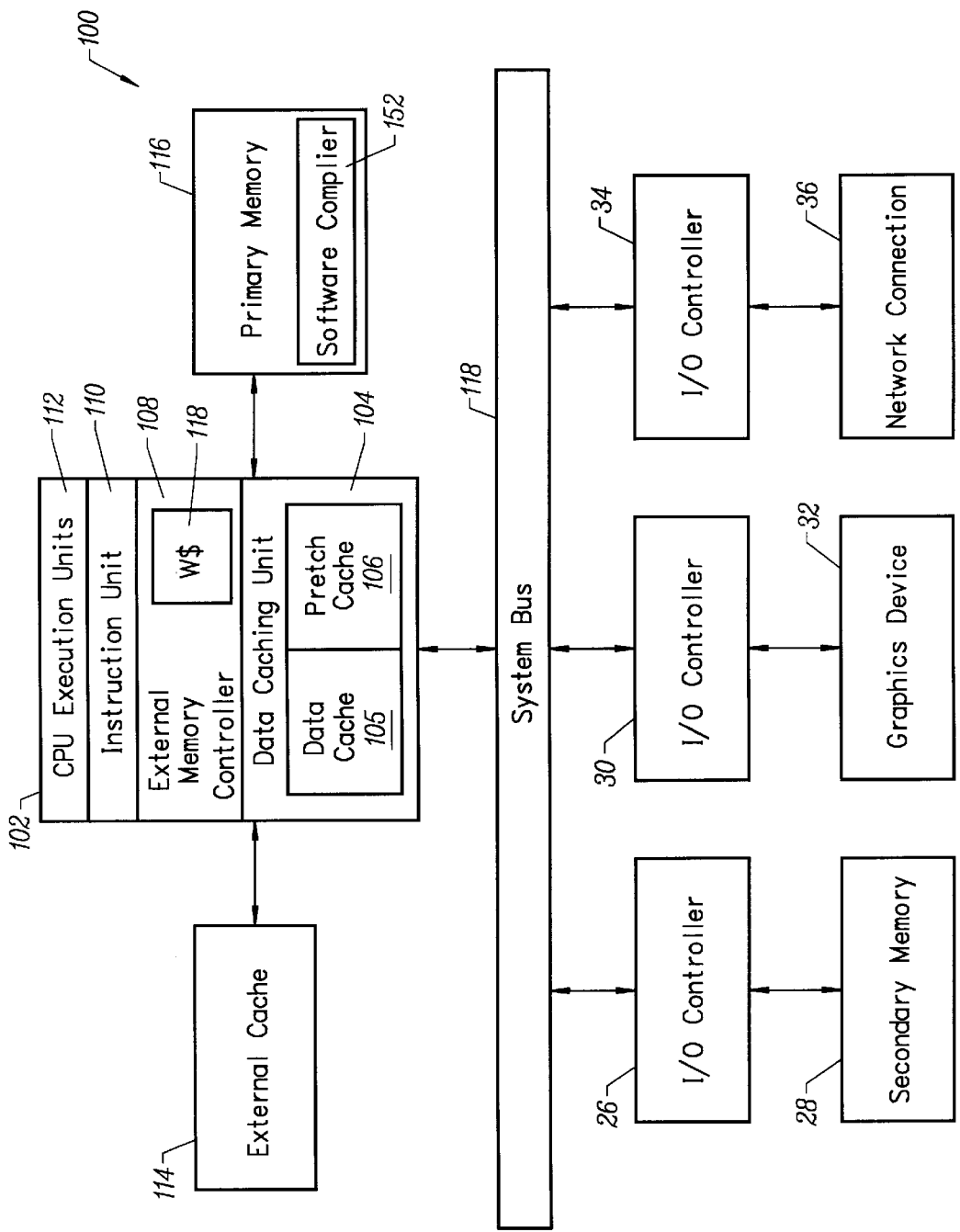
FIG. 3 illustrates a general purpose computer incorporating a central processing unit in accordance with an embodiment of the present invention.

Referring to FIG. 3, a computer 100 constructed in accordance with one embodiment of the present invention includes a central processing unit (CPU) 102 having a data caching unit 104, an external memory controller (EMC) 108, an instruction unit 110, and CPU execution units 112. The data caching unit 104 includes a single-ported data cache (D$) 105 and a dual-ported prefetch cache (P$) 106. The EMC 108 includes circuitry for controlling an external cache 114 and circuitry for controlling a primary memory 116, and also includes a write cache (W$) 118. The CPU execution units 112 include components such as, for instance, arithmetic logic units (ALUs), shift circuits, and a program counter, which are used in the processing of instructions and data of a computer program. The computer 100 may also include other conventional components consistent with those shown in FIG. 1. Note that in the discussion below, "external memory" refers to memory which resides outside the CPU 102, e.g., external cache 114, primary memory 116, and secondary memory 26. A conventional software compiler 152 resides within the primary memory 116.

Figure 4:
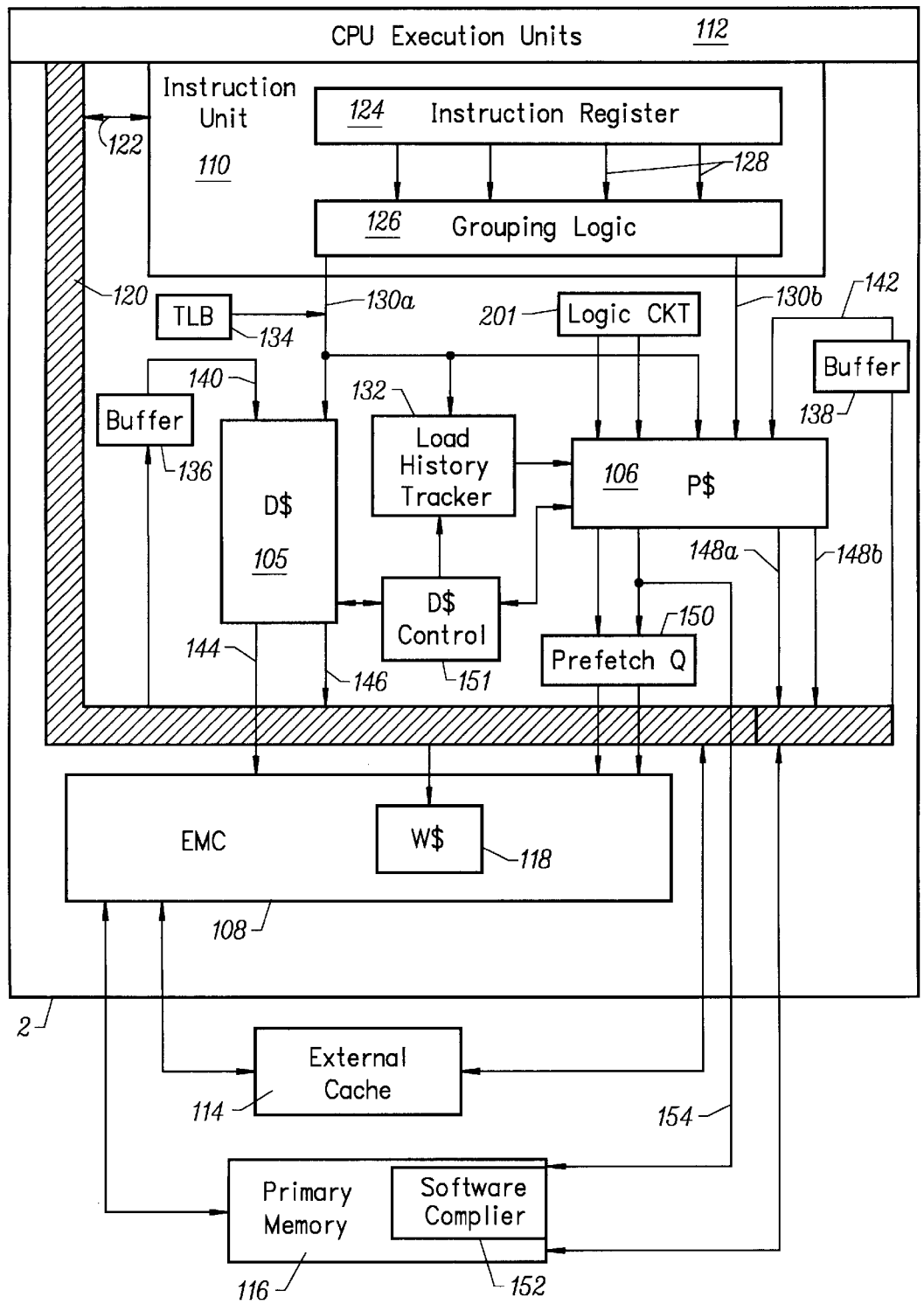
FIG. 4 illustrates one embodiment of the central processing unit of the general purpose computer of FIG. 3.

Referring to FIG. 4, the instruction unit 110 communicates with an internal CPU bus 120 via one or more signal lines or buses 122 and includes an instruction register 124 and a grouping logic circuit 126. In some embodiments, the instruction register 124 may forward up to four instructions per cycle to the grouping logic circuit 126 via signal lines 128. As explained in detail below, the grouping logic circuit 126 pairs data requests from instructions queued within the grouping logic circuit 126 for simultaneous processing in primary 130a and secondary 130b pipelines. The data cache 105 is coupled to receive data requests from the primary pipeline 130a, and the prefetch cache 106 is coupled to receive data requests from the primary pipeline 130a and a secondary pipeline 130b. In the particular embodiment described herein, these data requests are in the form of virtual addresses.

Figure 5:
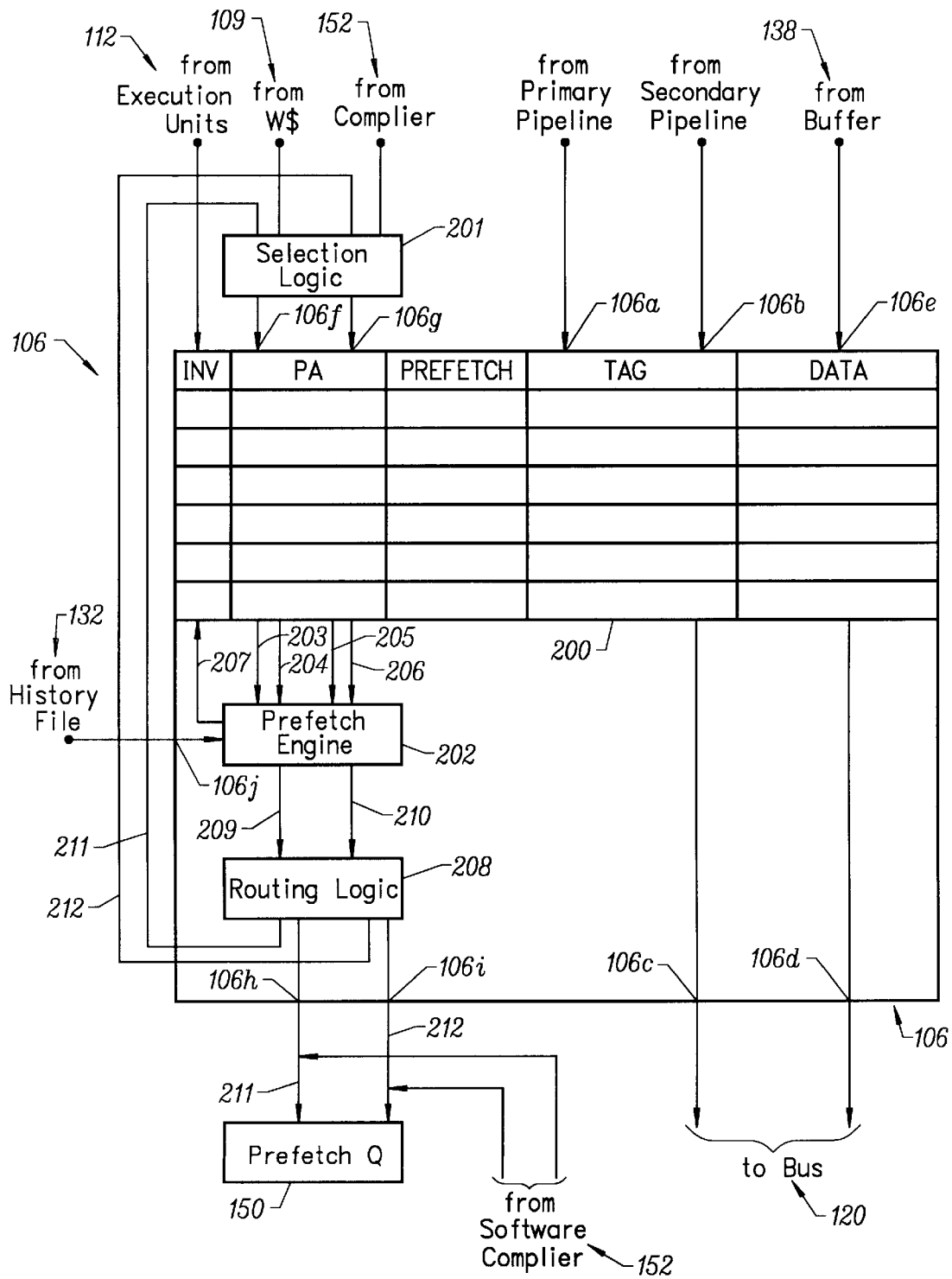
FIG. 5 illustrates one embodiment of a prefetch cache employed in the central processing unit of the general purpose computer of FIG. 3.

Referring now to FIG. 5, which shows one embodiment of the prefetch cache 106, the line entries of a cache array 200 within the prefetch cache 106 are divided into fields DATA, INV, PA, PREFETCH, and TAG, where the field DATA contains a row of data prefetched from external memory, the field INV contains one or more bits used to indicate the validity of corresponding data during snoop operations, the field PA contains the physical address of the corresponding data, the field PREFETCH contains one or more bits indicating whether the physical address of data within that line has been previously used for prefetching data, and the field TAG contains the virtual address tag of data within that line. In the particular embodiment described herein, the prefetch cache array 200 is a 2 KByte fully associative SRAM in which 32 Bytes of data may be stored in the DATA field of each of 32 line entries. Preferably, the data cache 105 of this embodiment is a 64 KByte fully associative SRAM in which 512 lines of 32-Bytes of data may be stored.

The dual-ported prefetch cache 106 includes two input tag ports 106a and 106b coupled to the primary pipeline 130a and the secondary pipeline 130b, respectively. The virtual address received at the input port 106a is compared to entries in the TAG field of the array 200. If a match is found, data specified by the virtual address is output at an associated data output port 106c. In a similar manner, data specified by the virtual address received at the input port 106b is output at an associated data output port 106d. Data prefetched from external memory is loaded into the prefetch cache 106 via a data input port 106e.

Consistency is maintained between the write cache 118 and the data cache 105 using a well known snooping mechanism to ensure the validity of data stored within the data cache 105. A similar snooping mechanism may be employed to maintain consistency between the write cache 118 and the prefetch cache 106, thereby also ensuring the validity of data stored within the prefetch cache 106. For instance, during snooping operations of the prefetch cache 106, the physical addresses of data within the write cache 118 are provided to one of two snoop input ports 106f and 106g of the prefetch cache 106 via a snoop input selection logic circuit 201 and compared to entries in the PA field of the prefetch cache array 200. If there is a prefetch cache hit during such snooping operations, the INV bit associated with the data identified by the physical address received at the snoop port is asserted, thereby indicating that the data is no longer valid.

The prefetch cache 106 further includes a prefetch engine 202 coupled to the prefetch cache array 200 via signal lines 203–207. Except during snooping operations to maintain consistency between the write cache 118 and the prefetch cache 106, the prefetch engine 202 derives, in response to each prefetch cache hit, a prefetch address from the physical address corresponding to the prefetch cache hit. This derived prefetch address specifies data which, under certain circumstances outlined below, may be prefetched from external memory into the prefetch cache 106. These "prefetch" addresses may be forwarded, two at a time, to a prefetch address routing logic circuit 208 via respective signal lines 209 and 210. As will be described below, the prefetch address routing logic circuit 208 may, when it is desired to prefetch data from external memory, provide these prefetch addresses to output ports 106h and 106i or, when it is desired to snoop the prefetch cache 106 for these prefetch addresses, provide these prefetch addresses to respective input ports of the snoop input selection logic circuit 201 via signal lines 211 and 212. In preferred embodiments, a prefetch queue 150 is coupled to the output ports 106h and 106i to store one or more of these prefetch addresses until external memory is available for searching.

As mentioned earlier, data stored in the data cache 105 and the prefetch cache 106 may be accessed via the virtual addresses received from the primary pipeline 130a and the secondary pipeline 130b. Data stored in external memory is accessed using physical addresses. Thus, in order to retrieve data from external memory, the virtual addresses provided in the primary pipeline 130a and the secondary pipeline 130b must be converted to physical addresses. Referring again to FIG. 4, a translation look-aside buffer (TLB) 134 is coupled to the primary pipeline 130a and stores virtual address to physical address mappings to allow rapid retrieval of data from external memory. Data requests from the primary pipeline 130a are matched in the TLB 134 and can then be directly routed to external memory for retrieval of data. Data requests from the secondary pipeline 130b are recirculated to the primary pipeline 130a for conversion into physical addresses. Of course, in other embodiments, a TLB similar to the TLB 134 may be coupled to the secondary pipeline 130b to allow data requests within the secondary pipeline 130b to be routed to external memory without recirculating.

During execution of a computer program by the CPU execution units 112, the instructions of the computer program are fetched in a well known manner according to the program counter (not shown), and then latched into the instruction register 124. Each instruction includes a load prediction (LP) bit that indicates whether data requested by that instruction is likely to be stored in the prefetch cache 106. The LP bit associated with a particular instruction is asserted when data requested by the instruction is loaded into the prefetch cache 106, as explained in detail below. The instructions are then forwarded to and queued within the grouping logic circuit 126 which, in response to the LP bits of the queued instructions, pairs respective data requests of the instructions for simultaneous execution via the primary pipeline 130a and the secondary pipeline 130b.

If the LP bit associated with a given data request is asserted, thereby indicating that the data is likely to be stored in the prefetch cache 106, the data request may be sent down either the primary pipeline 130a or the secondary pipeline 130b, since both pipelines allow access to the prefetch cache 106. If, on the other hand, the LP bit associated with a given data request is not asserted, thereby indicating that the data is not likely to be stored within the prefetch cache 106, the data request is routed to the primary pipeline 130a. In this manner, access to external memory does not require recirculation. Data requests corresponding to asserted LP bits may be paired together for simultaneous processing, since the prefetch cache 106 is accessible from both pipelines 130a and 130b. Data requests corresponding to asserted LP bits may be paired with data requests corresponding to un-asserted LP bits, in which case the data request corresponding to the un-asserted LP bit is routed to the primary pipeline 130a, since access to external memory may be required. Finally, data requests corresponding to un-asserted LP bits are not paired with one another, since both data requests may require access to external memory and should therefore be routed down the primary pipeline 130a.

During initial execution of a computer program, the LP bits of instructions of the computer program are initialized to an un-asserted state, and the data cache 105 and the prefetch cache 106 are initially empty. Thus, the first instruction processed by the instruction unit 110 is unpaired and is routed to the primary pipeline 130a which, in turn, provides the associated data request to the data cache 105 and the prefetch cache 106. Since both the data cache 105 and the prefetch cache 106 are initially empty, there is a miss to the data cache 105 and a miss to the prefetch cache 106, thereby necessitating access to external memory. The physical address of the requested data is retrieved from TLB 134 and provided to the EMC 108 via line 144. The external cache 114, the primary memory 116, and secondary memory 26 are then sequentially searched for the requested data. Once located, the requested data is forwarded to the CPU execution units 112 for processing and, in addition, the row of data corresponding to the physical address of the requested data is retrieved from external memory and latched into buffers 136 and 138, respectively. This row of data, which preferably is of the same line size as are entries in the data cache 105, i.e., 32 Bytes, is then loaded into the data cache 105 from buffer 136 via signal line 140 and into the prefetch cache 106 from buffer 138 via signal line 142. The INV bit and the PREFETCH bit associated with this and all rows of data loaded into the data cache 105 and the prefetch cache 106 in response to a data cache miss are initialized to a non-asserted state.

The next data request is also unpaired and sent to the primary pipeline 130a, since its LP bit has not yet been asserted. If the requested data is in the data cache 105, the data is immediately forwarded to the CPU execution units 112 for processing via signal lines 146 and the internal bus 120. If the requested data is found in the prefetch cache 106, the specified data is immediately provided to the CPU execution units 112 for processing via signal lines 148a and internal bus 120. The hit or miss condition of the prefetch cache 106 is communicated to a data cache controller 151 which, in response to a prefetch cache hit, prevents the data cache 105 from sending duplicate data to the CPU execution units 112.

The occurrence of a prefetch cache hit triggers the prefetching of data into the prefetch cache 106, as follows. Referring again to FIG. 5, if the PREFETCH bit associated with the requested data is asserted, prefetching is terminated and the prefetch cache 106 awaits the next virtual address. If, on the other hand, the PREFETCH bit is not asserted, the physical address of the requested data is extracted from the PA field of the prefetch cache array 200 and provided to the prefetch engine 202 via signal line 203.

The prefetch engine 202 adds a stride to the extracted physical address and thereby derives a prefetch address which, in turn, is provided to the prefetch address routing logic circuit 208 via line 209. If certain conditions are met, as outlined below, a row of data corresponding to the derived prefetch address is retrieved from external memory and loaded into the prefetch cache 106.

Before prefetching data, it is first necessary to ensure that the data identified by the derived prefetch address is not already stored within the prefetch cache 106. Accordingly, the prefetch cache 106 enters an "internal snoop" mode, and the derived prefetch address is routed to the snoop input selection logic circuit 201 via signal line 211. The selection logic circuit 201 forwards the derived prefetch address to the snoop port 106f for comparison with entries in the physical address PA field of the prefetch cache array 200. If a match is found, a "hit" signal is provided via line 204 to the prefetch engine 202 which, in response thereto, terminates prefetching. In some embodiments, the PREFETCH bit associated with the requested data is asserted in response to an internal snoop mode prefetch cache hit, thereby allowing subsequent prefetching based upon hits to the requested data to be immediately terminated without having to again snoop the prefetch cache 106. In such embodiments, additional logic is required to inform the prefetch cache 106 which PREFETCH bit to assert in response to a prefetch cache hit during internal snoop mode. In other embodiments, the PREFETCH bit associated with first data in the prefetch cache 106 is asserted when second data, specified by a prefetch address derived from the first data, is loaded into the prefetch cache.

If, on the other hand, a match is not found within prefetch cache 106 during the internal prefetch cache snoop, a "miss" signal is generated and, in response thereto, the prefetch address routing logic circuit 208 forwards the derived prefetch address to the prefetch queue 150 via output address port 106h. In some embodiments, the prefetch engine 202 ensures that the physical address of the requested data and the derived prefetch address refer to the same page in external memory before the derived prefetch address is routed to the prefetch queue 150.

Note that when the prefetch cache 106 is in internal snoop mode, the prefetch engine 202 provides a control signal via line 207 to the prefetch cache array 200 so that, in contrast to snooping operations which maintain consistency between the prefetch cache 106 and the write cache 118, a prefetch cache hit during internal snoop does not invalidate data.

Referring now to FIG. 4, if the derived prefetch address is already stored within the prefetch queue 150, prefetching is terminated and the derived prefetch address is discarded. If, on the other hand, the derived prefetch address is not already in the prefetch queue 150, the derived prefetch address is provided to the EMC 108 for retrieval of a corresponding row of data from external memory. This row of data, which is preferably equal to the line size of the prefetch cache 106, e.g., 64 Bytes, is then loaded into the prefetch cache 106.

Thereafter, those instructions having an asserted LP bit may be grouped for execution with another instruction, thereby facilitating the simultaneous processing of two data requests per cycle. In this scenario, the data request corresponding to the instruction having an asserted LP bit is routed to the secondary pipeline 130b, and the data request corresponding to the other instruction is routed to the primary pipeline 130a. If the data request from the secondary pipeline 130b results in a prefetch cache hit, data specified by the data request is rapidly provided to the CPU execution units 110 for processing. In a similar manner, if the data request from the primary pipeline 130 results in either a data cache hit or a prefetch cache hit, data specified by the data request is rapidly provided to the CPU execution units 110 for processing.

As mentioned above, the prefetch cache 106 is dual ported and therefore may simultaneously process two data requests and, in addition, may simultaneously derive two prefetch address. Thus, if the data requests routed down the primary pipeline 130a and the secondary pipeline 130b both result in prefetch cache hits, two prefetch addresses are derived. The first prefetch address is derived from the physical address specified in the data request provided by the primary pipeline 130a, and the second prefetch address is derived from the physical address of the data request provided by the secondary pipeline 130b. These two derived prefetch addresses may be simultaneously compared with existing entries in the PA field of the prefetch cache array 200 in the manner described above with respect to internal prefetch snooping operations, where the role of signal lines 205, 206, 210, and 212 is analogous to the previously described operation of respective lines 203, 204, 209, and 211. If no matches are found in the prefetch cache array 200 during internal snooping, and if neither of the derived prefetch address result in the crossing of a page boundary in external memory, the two derived prefetch addresses are provided to the prefetch queue via respective ports 106h and 106i.

During those cycles in which two data requests are simultaneously processed, it is possible that one or both of the data requests will result in a prefetch cache miss. If the two data requests are unrelated, that is, processing of the corresponding instructions does not depend upon the results of either instruction, then the data request(s) which resulted in a prefetch cache miss is (are) routed to the EMC 108 to retrieve the specified data, as discussed earlier. If, on the other hand, the two corresponding instructions are related, additional processing is required, as follows. If the data request which resulted in the prefetch cache miss corresponds to an instruction which precedes the other instruction of the pair, the preceding instruction, as well as all instructions thereafter, are recirculated. If, on the other hand, the data request which resulted in a prefetch cache miss succeeds the other instruction of the pair, then both instructions, as well as all instructions thereafter, are recirculated. In this manner, the validity of data requested by related instructions is ensured. Note that when recirculated, an instruction is routed to the primary pipeline 130a to allow access to the TLB 134 which, as discussed earlier, is necessary to access external memory.

Prefetching data into the prefetch cache 106 as described above allows data expected to be needed by subsequently executed instructions to be immediately available for processing without accessing external memory. Since instruction addresses are relatively deterministic, especially in applications such as, for instance, database processing and graphics applications, it is likely that data requested by such instructions corresponds to sequential addresses in external memory. Accordingly, during execution of programs in which sequentially requested data corresponds to sequential memory addresses, there is a strong likelihood that data prefetched into the prefetch cache 106 in the manner described above during a particular cycle will be needed in subsequent cycles. This ability to prefetch data from external memory into internal cache memory prior to requests of the data from the instruction stream eliminates a trip through the memory hierarchy of the computer 100 and, thus, allows latencies associated with accessing and retrieving data from external memory to be hidden. If data can be continually prefetched before being requested by the instruction stream, significant reductions in processing delays may be achieved. Note that since data is prefetched into only the prefetch cache 106, present embodiments do not pollute the data cache 105 will speculative data, thereby ensuring that the operation of the data cache 105 is not compromised by the prefetching of data. Further note that prefetching in accordance with the present invention is preferably executed only when the primary memory controller is not busy, thereby avoiding a compromising of the performance of the EMC 108.

Data bandwidth may be further improved by simultaneously processing two data requests. Thus, although not necessary, it would be desirable for instructions having asserted LP bits to be paired together so that data requested by both instructions is likely to stored in the prefetch cache 106. If both of the respective data requests result in prefetch cache hits, then two corresponding sets of data may be rapidly provided to the CPU execution units 110 for processing, without having to access external memory. In this scenario, the present invention has not only hidden latencies associated with accessing external memory but also allowed two data requests to be simultaneously processed. Further, since the prefetch cache 106 is only a fraction of the size of the data cache 105, the increase in data bandwidth is achieved without a resultant doubling in cost in the data caching unit. In the example provided herein, Applicants have found that the inclusion of the prefetch cache 106 into the data caching unit 104 of the CPU 102, as described in the example above, results in a significant increase in data bandwidth, with only a minor increase in silicon area.

It is possible to simultaneously process two data loads without pairing instructions having asserted LP bits. For instance, where a first instruction having an asserted LP bit is paired with a second instruction having an un-asserted LP bit, the data request of the first instruction may result in a prefetch cache hit and the data request of the second instruction may result in a data cache hit. In this manner, two data requests may be simultaneously processed without accessing external memory.

Data bandwidth may also be increased by maximizing the number of hits to the prefetch cache 106 during execution of a computer program. The number of prefetch cache hits may, in turn, be increased by more accurately predicting which data will next be requested in the instruction stream of the computer program. As noted earlier, the prefetch address is derived by adding a stride to the physical address of the data requests which resulted in a prefetch cache hit. In some embodiments, the stride is a fixed value equal to the line size of data rows in external memory. For instance, where a row of data in external memory is 64 Bytes, the stride is a fixed value of 64 Bytes. Note that the line size of the DATA field in the array 200 of the prefetch cache 106 is preferably of the same line size as external memory, which in the present example is 64 Bytes. In preferred embodiments, however, the stride is a variable whose value depends upon the particular instruction loop and data request characteristics of the computer program.

Figure 6:
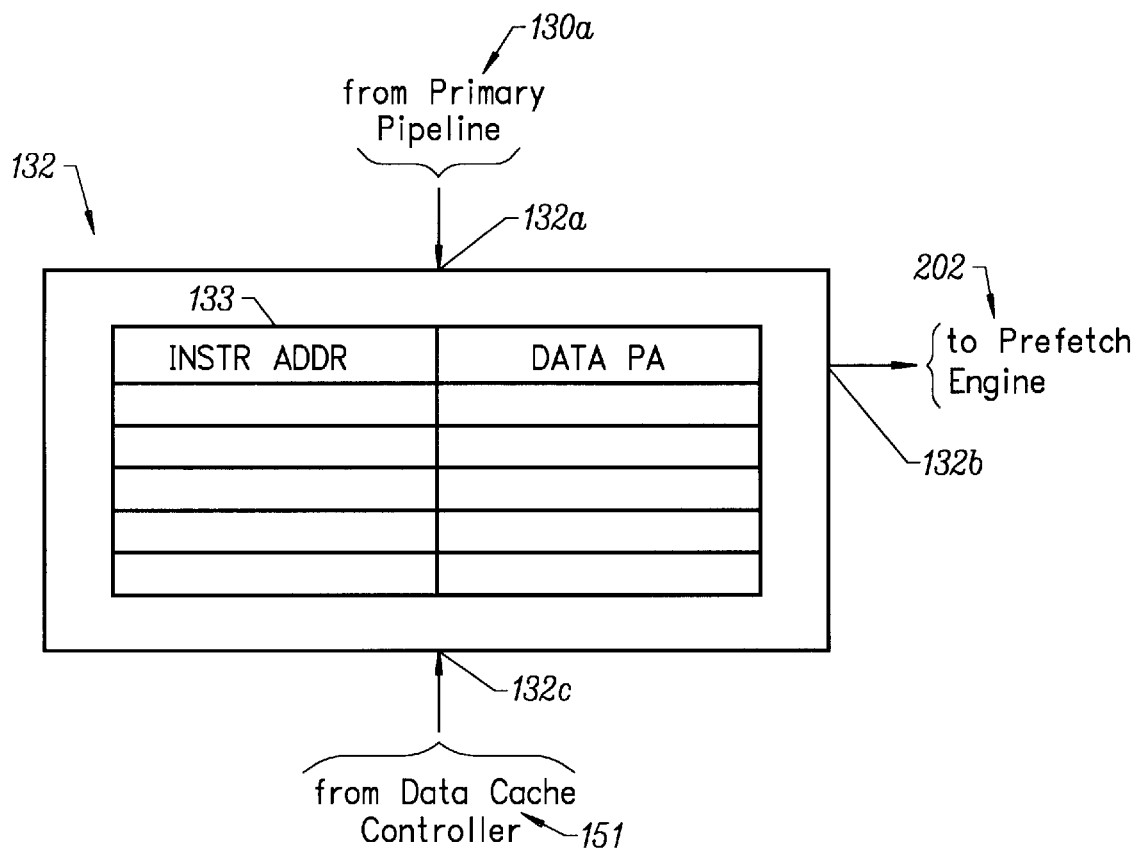
FIG. 6 illustrates one embodiment of a data load history tracker used in conjunction with the prefetch cache of FIG. 5.

In these preferred embodiments, the CPU 102 further includes a data load history tracking circuit 132 for generating a stride indicative of instruction loop heuristics of the currently executed computer program. Referring to FIG. 6, the tracking circuit 132 includes, in one embodiment, a fully associative cache 133 divided into a DATA PA field and an INSTR ADDR field. The tracking circuit 132 has an input port 132*a* coupled to the primary pipeline 130*a* and an output port 132*b* coupled to an input port 106*j* of the prefetch cache 106 (see also FIG. 5). The load history cache 133, which is initially empty, is filled in response to prefetch cache misses. Thus, for every data request which results in a prefetch cache miss, the corresponding row of data retrieved from external memory, which, as described above, is loaded into the data cache 105 and the prefetch cache 106, is also loaded into the load history cache 133 via input port 132*a*. During such loads into the load history cache 133, as indicated by a control signal generated by the data cache controller 150 and provided to the load history tracking circuit 132 via a control port 132*c*, the physical address of the retrieved data is stored within the DATA PA field of the load history cache 133, and the address of the corresponding load instruction, which may be, for instance, the value of the program counter for that instruction, is stored in the INSTR ADDR field of the load history cache 133.

For each subsequent data request routed to the primary pipeline 130*a*, the address of the corresponding instruction is extracted from the data request and compared to entries within the INSTR ADDR field of the load history cache 133. If there is a match, thereby indicating a hit to an associated line entry of the load history cache 133, the load history cache 133 outputs the physical address from the DATA PA field of that line entry and subtracts therefrom the physical address of the presently requested data to generate a stride. Once provided at the output port 132*b* of the tracking circuit 132, the stride is forwarded to the prefetch engine 202, and thereafter used to derive a prefetch address in the manner described above. If for a particular prefetch cache hit there is not a corresponding entry in the load history cache 133, the stride defaults to a fixed value such as, for instance, the line size of data entries in external memory. Entries within the load history cache 133, as well as entries in the data cache 105 and the prefetch cache 106, are removed according to a well known pseudo least recently used (LRU) method.

By maintaining a running history of the physical addresses of data requests and of their corresponding instructions, the tracking circuit 132 identifies code loops within a computer program which access data having a fixed stride. Once this stride is determined, it may be used as described above to more accurately predict which data will be soon requested in the instruction stream of a computer program being executed by the CPU 102. Accordingly, by more accurately predicting which data will next be requested by the computer program, the tracking circuit 132 allows latencies associated with accessing external memory to be hidden to a much greater extent than is possible when using a fixed stride.

The hit rate of the prefetch cache 106 for a particular computer program, and thus the data bandwidth of the computer 100, may be even further increased if the computer program is written in a manner that takes advantage of the data prefetching mechanism described above to ensure that data requested in a particular instruction is prefetched into the prefetch cache in response to a previous instruction.

In other embodiments of the present invention, the software compiler 152 is used to prefetch data into the prefetch cache 106 and to invalidate data presently stored in the prefetch cache 106. The ability to quickly invalidate data in the prefetch cache 106 using commands directly from the software compiler 152 allows non-cachable data to be stored in internal cache memory, e.g., the prefetch cache 106. Conventionally, data is considered to be non-cachable where the data is rewritten so frequently that conventional snooping operations are not fast enough to guarantee the validity of the data while stored in internal cache memory. As a result, this data was not, in prior art systems, loaded into internal cache memory (hence the name non-cachable data).

The software compiler 152, which in some embodiments runs within the primary memory 116 of the computer 100 (see FIG. 4), may schedule a prefetch address to be delivered directly to the prefetch queue 150 via line 154 during execution of a computer program. The software compiler 152 derives the prefetch address in a manner similar to that described above, i.e., a stride is added to the physical address of data previously requested by the computer program to derive the prefetch address. Data corresponding to the prefetch address is then loaded into the prefetch cache 106 as described above.

The software compiler 152 identifies data that is soon to be rewritten during execution of the computer program, and ensures that any copies of that data stored within the prefetch cache 106 are invalidated. When the software compiler 152 identifies data that is to be rewritten, the physical address of that data is provided to an input port of the selection logic circuit 201. In response to a control signal provided by the software compiler 152, the selection logic circuit 201 forwards the physical address to the input snoop port 106g of the prefetch cache 106 for comparison with entries in the physical address PA field of the prefetch cache array 200. If a match is found, data specified by the physical address provided by the software compiler 152 invalidated.

In this manner, data is directly invalidated by commands provided by the software compiler 152, thereby bypassing conventional hardware snooping techniques such as, for instance, those discussed above that maintain consistency between data in the write cache 118 and the prefetch cache 106. The ability to invalidate data in the prefetch cache 106 with commands issued directly from the software compiler 152 eliminates the latencies associated with conventional hardware snooping techniques, thereby significantly improving the speed with which data in internal cache memory, e.g., the prefetch cache 106, may be invalidated.

The ability to more quickly invalidate data in the prefetch cache 106, in turn, allows present embodiments to ensure the validity of "non-cachable" data stored in the prefetch cache 106. Consequently, "non-cachable" data such as, for instance, graphics data, may be stored in the prefetch cache 106 and, thus, may be immediately provided to the CPU execution units 112 for processing in response to an address request. In this manner, latencies associated with retrieving graphics data and other data conventionally considered to be non-cachable from external memory may be hidden, thereby further increasing data bandwidth.

When data is loaded into the prefetch cache 106, the INV bit associated with that data is initialized to a non-asserted state. Accordingly, when a physical address provided to the prefetch cache 106 by the software compiler 152 during a software data invalidate operation results in a prefetch cache hit, the INV bit associated with the data specified by the physical address is asserted, thereby invalidating the data.

Figure 7:
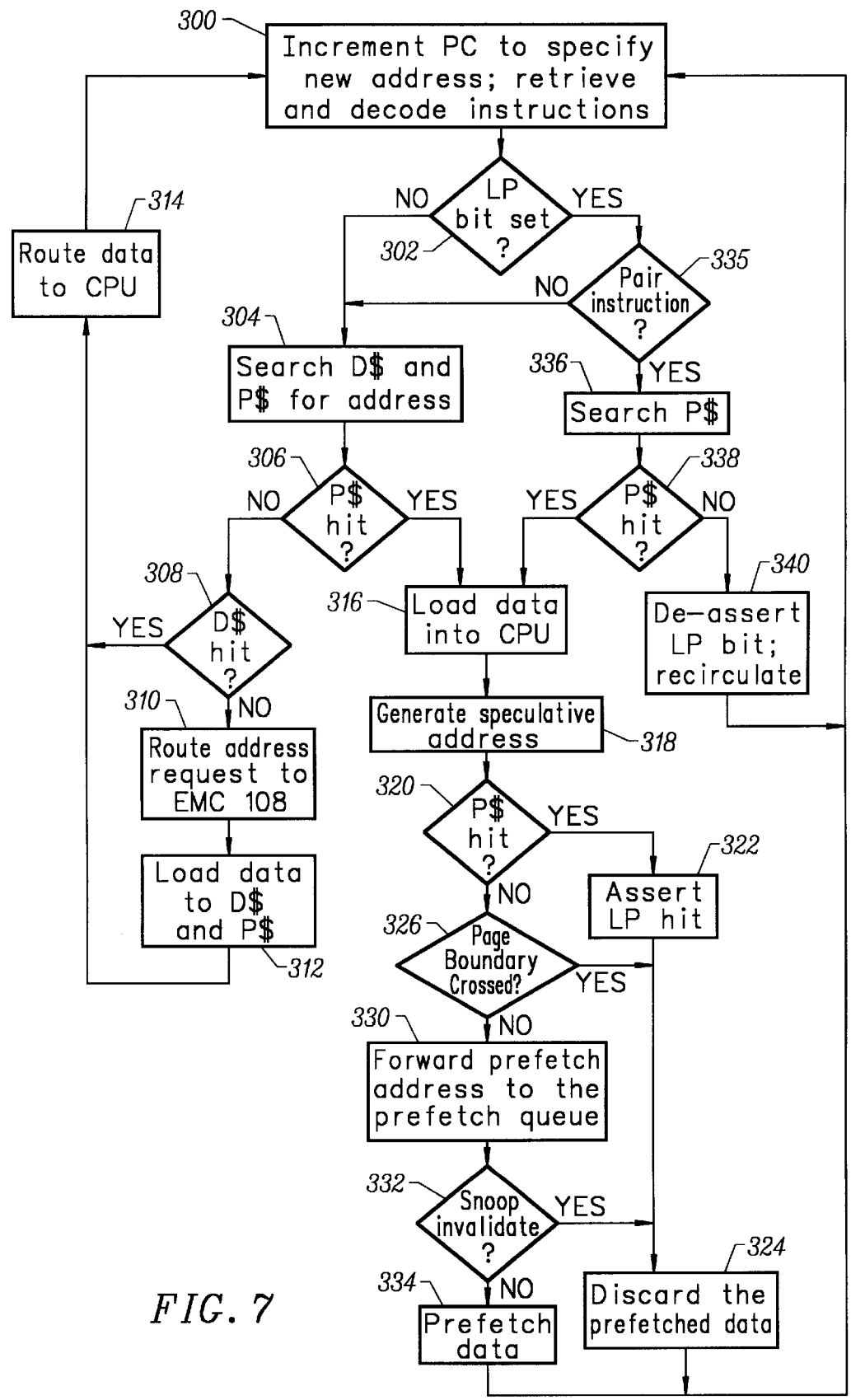
FIG. 7 illustrates the processing of an address request through a computer memory hierarchy in accordance with an embodiment of the present invention.

The foregoing operations are more fully appreciated with reference to FIG. 7, where the description below is applicable for the processing of both paired and unpaired instructions. The first processing step shown in FIG. 7 is to increment the program counter to specify a new address (step 300). The grouping logic circuit 126 within the CPU 102 predicts whether two data requests may be executed in a cycle by examining the LP bits of instructions queued therein, as discussed in detail above. If the LP bit of an instruction is not asserted, the instruction is sent down the primary pipeline 130a (step 302) and thereafter provided as a virtual address tag to the data cache 105 and to the prefetch cache 106, as indicated in step 304. If the requested data is found in neither the prefetch cache 106 nor the data cache 105, as tested in steps 306 and 308, respectively, the data request is forwarded to the EMC 108 (step 310). In response thereto, a corresponding row of data is retrieved from external memory and loaded into the data cache 105 and the prefetch cache 106 (step 312), and the requested data is sent to the CPU 102 for processing (step 314). If, on the other hand, the requested data is in the data cache 105, as tested in step 308, the data is immediately forwarded to the CPU for processing (step 314).

Where the requested data is in the prefetch cache 106, as tested at step 306, the data is immediately provided from the prefetch cache 106 to the CPU 102 for processing (step 316), and prefetching is initiated. The prefetch engine 202, in response to either a fixed stride generated therein or a stride provided by the tracking circuit 132, generates a prefetch address (step 318). The prefetch cache 106 is then searched for the prefetch address (step 320) to prevent the prefetching of data already in the prefetch cache 106. If the prefetch address is in the prefetch cache 106, the PREFETCH bit of the corresponding data within the prefetch cache 106 is asserted (step 322), and the prefetch address is discarded, thereby terminating the prefetch operation (step 324).

If, on the other hand, the prefetch address is not in the prefetch cache 106, the prefetch address is checked to ensure that a page boundary in external memory has not been crossed, as tested at step 326. If a page boundary has not been crossed, the prefetch address is queued in the prefetch queue 150 (step 328); otherwise, prefetching is terminated (step 324). If, after being queued within the prefetch queue 150, the prefetch address is not invalidated by subsequent snoop operations initiated by the write cache 118, as tested in step 332, a row of data corresponding to the prefetch address is retrieved from external memory and loaded into the prefetch cache 106 (step 334). The PREFETCH bit associated with the line of data in the prefetch cache 106 hit by the address request is asserted.

Where the LP bit of an instruction is set, as tested at step 302, the corresponding data request may, as discussed above, be paired with another instruction for processing, as tested at step 335. If not paired with another instruction, the instruction is routed to the primary pipeline, and processing proceeds to step 304, as discussed earlier. If paired with another instruction, the instruction is routed to the secondary pipeline 130b, and the prefetch cache is searched for data requested by the instruction (step 336). If the requested data is in the prefetch cache 106, processing proceeds to step 316, as described earlier. If, on the other hand, the requested data is not found in the prefetch cache 106, the LP bit of that bit is un-asserted, and the data request is recirculated to the primary pipeline 130a (step 340). While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A central processing unit of a computer, comprising:
   a data cache for storing data specified by an address request of a first instruction;
   a prefetch cache for generating a prefetch cache hit signal in response to said address request; and
   a prefetch engine for deriving in response to said prefetch cache hit signal, a prefetch address which specifies data predicted to be requested in one or more instructions subsequent to said first instruction, wherein said prefetch engine includes:
      an adder to add a stride to a physical address of said data specified by said address request;
      first and second input ports coupled to simultaneously receive from said prefetch cache first and second physical addresses, respectively; and
      first and second output ports for providing first and second prefetch addresses to a memory external to said central processing unit, said first and second prefetch addresses derived from said first and second physical addresses, respectively.

2. The apparatus of claim 1, wherein said prefetch engine derives said first and second prefetch addresses by adding a stride to said first and second physical addresses, respectively.

3. The apparatus of claim 2, wherein said stride is a fixed value.

4. The apparatus of claim 2, wherein said stride is a variable, the value of which depends upon instruction loop heuristics of a computer program being executed by said central processing unit.

5. The apparatus of claim 1, wherein said prefetch engine derives said first prefetch address by adding a first stride to said first physical address, and derives said second prefetch address by adding a second stride to said second physical address, wherein said first stride is different from said second stride.

6. The apparatus of claim 5, wherein said first and second strides are fixed values.

7. The apparatus of claim 5, wherein said first and second strides are variables, the values of each depending upon instruction loop heuristics of a computer program being executed by said central processing unit.

8. A method for generating two prefetch addresses in response to two data requests from, respectively, a first instruction and a second instruction which are grouped, said grouped first and second instructions being executed by a central processing unit, said prefetch addresses identifying data which are to be prefetched into prefetch cache memory of said central processing unit and which are predicted to be requested in instructions subsequent to said grouped first and second instructions, said method comprising the steps of:
   extracting from said first and second instructions a first address and a second address, respectively, corresponding to said data requests;
   inputting said first address and said second address into a multi-port prefetch engine;
   adding a stride to said first address and said second address; and
   deriving, respectively, said first and second prefetch addresses from said first address and said second address.

9. The method of claim 8, wherein said adding step includes the step of adding a variable stride that depends upon loop heuristics.

10. A central processing unit of a computer, comprising:
   a data cache for storing data specified by two address requests of first and second instructions, respectively;
   a prefetch cache for generating prefetch cache hit signals in response to said address requests, said prefetch cache having first and second input ports coupled to substantially concurrently receive first and second data requests, respectively; and
   a multi-port prefetch engine for deriving, in response to each prefetch cache hit signal, a prefetch address which specifies data predicted to be requested in one or more instructions subsequent to said first and second instructions.

11. The central processing unit of claim 10, wherein said multi-port prefetch engine includes an adder to add a stride to a physical address of said data specified by said address request.

12. The apparatus of claim 11, wherein said stride is a fixed value.

13. The central processing unit of claim 11, wherein said stride is a variable, the value of which depends upon instruction loop heuristics of a computer program being executed by said central processing unit.

14. The central processing unit of claim 10, wherein said multi-port prefetch engine includes an input port coupled to an output port of said prefetch cache and an output port for providing said derived prefetch address to said external memory.

* * * * *